March 31, 1953 W. H. T. HOLDEN 2,633,495

ELECTRONIC CODE PULSE RECEIVING CIRCUIT

Filed Oct. 17, 1950 4 Sheets-Sheet 1

INVENTOR
W. H. T. HOLDEN
BY C. Mattice
ATTORNEY

INVENTOR
W. H. T. HOLDEN
BY C. Mattice
ATTORNEY

March 31, 1953 W. H. T. HOLDEN 2,633,495

ELECTRONIC CODE PULSE RECEIVING CIRCUIT

Filed Oct. 17, 1950 4 Sheets-Sheet 3

INVENTOR
W. H. T. HOLDEN
BY C. Mattice
ATTORNEY

March 31, 1953 W. H. T. HOLDEN 2,633,495

ELECTRONIC CODE PULSE RECEIVING CIRCUIT

Filed Oct. 17, 1950 4 Sheets-Sheet 4

INVENTOR
W. H. T. HOLDEN
BY C. Mattice
ATTORNEY

Patented Mar. 31, 1953

2,633,495

UNITED STATES PATENT OFFICE 2,633,495

ELECTRONIC CODE PULSE RECEIVING CIRCUIT

William H. T. Holden, Pasadena, Calif., assignor to Bell Telephone Laboratories, Incorporated, New York, N. Y., a corporation of New York Application October 17, 1950, Serial No. 190,493

2 Claims. (Cl. 179—16)

This invention relates to telephone systems and has for its object improvement in the reception and registration of designations in such systems.

The use of multifrequency pulses for the transmission of designations between offices is well known. In the sending of such pulses two frequencies are sent out simultaneously and are separated at the receiving office by means of filters tuned to the various frequencies which feed into individual detectors which in turn control registers.

One difficulty experienced with receiving such pulses is in controlling the strength of the signals as fed to the detectors.

In accordance with the present invention means is provided responsive to the signal strength for varying the sensitivity of the detectors.

More specifically, each filter operates into a high impedance full wave rectifier, arranged to deliver a negative and a positive output. All positive outputs are combined and operate to increase the positive grid bias of the detectors, while the individual negative outputs are applied to the grids of these same detectors.

These features of the invention will be more clearly understood from a consideration of the following description in connection with the drawings, in which.

Reference may be made to the patent to A. J. Busch, No. 2,585,904, granted February 19, 1952, for a complete telephone system to which the present invention might be applied.

Figure 1:
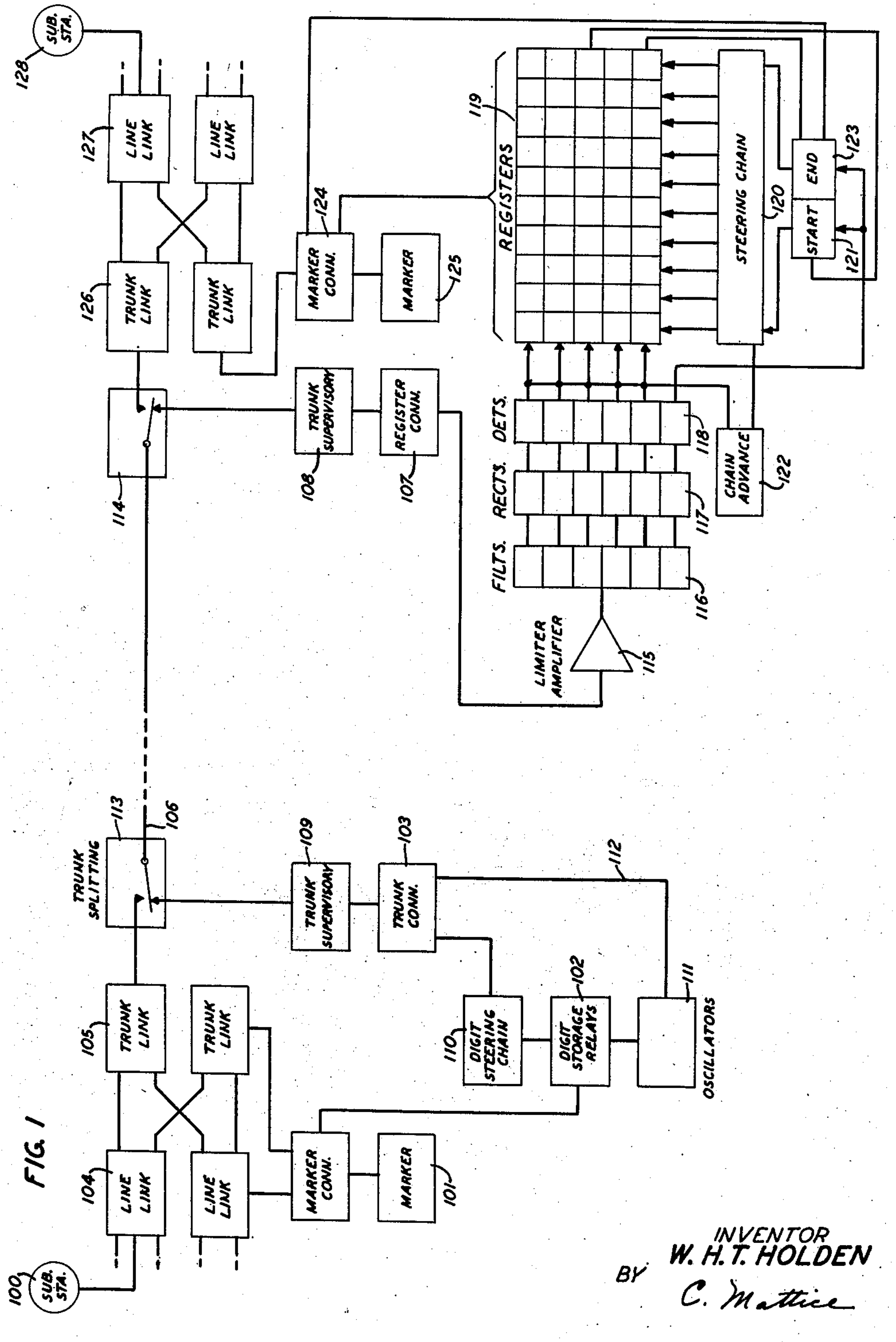
Fig. 1 is a schematic showing of a telephone system in which the present invention may be used.
Figures 2, 5:
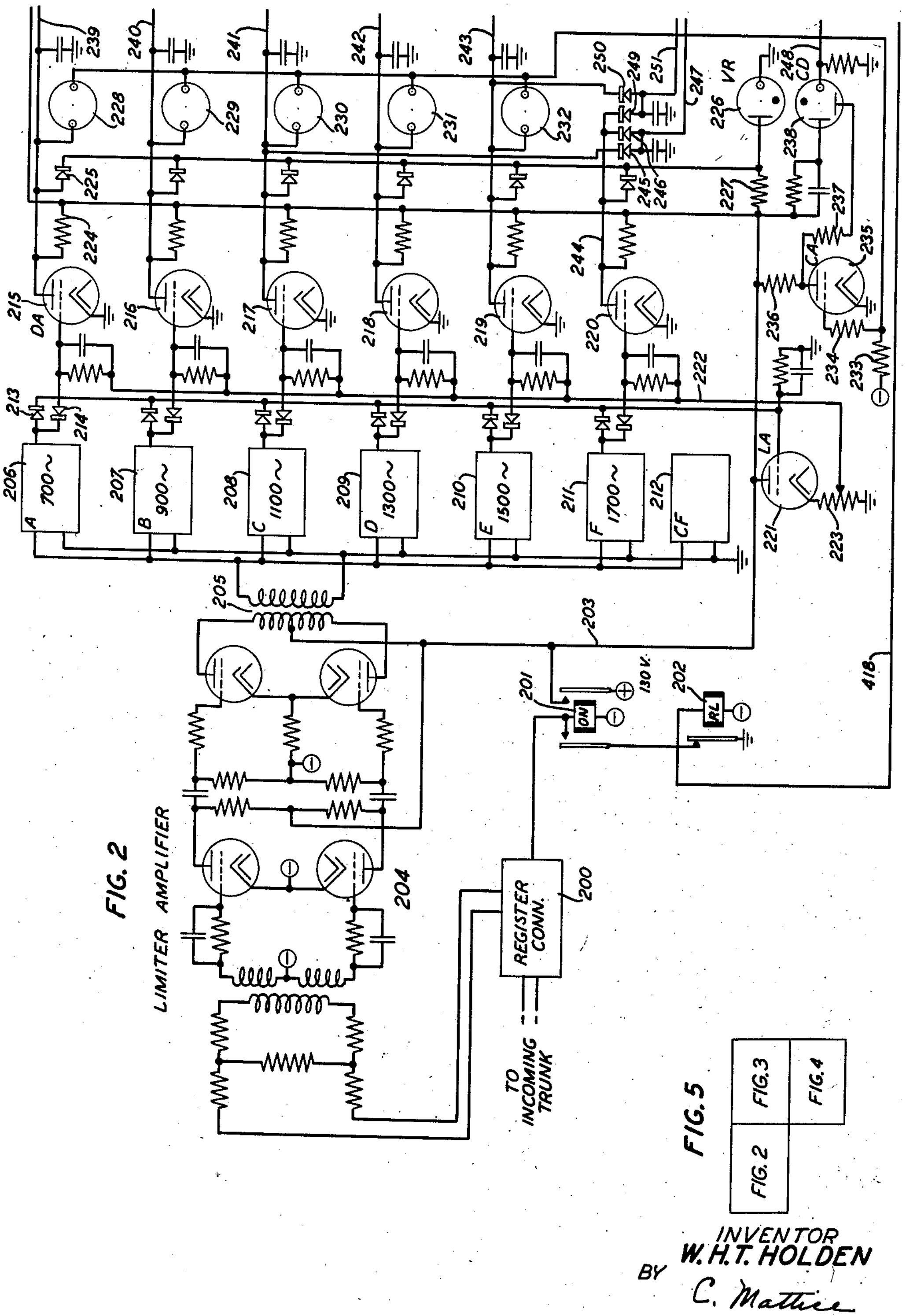
Fig. 2 shows the receiving filters and detectors.
Fig. 5 shows the manner in which Figs. 2 to 4 should be arranged.

Referring first to Fig. 1, when the subscriber at station 100 initiates a call, his line is connected with a register sender (not shown) in which he registers the designation of the wanted line. The register sender then calls in a marker 101 and transfers the designation to the marker. The marker translates that part of the designation identifying the office in which the wanted line is located and selects a trunk 106 outgoing to that office. Having also determined that the office is one requiring alternating-current code pulses, the marker selects a suitable sender, transfers the line designation to the digit storing relays 102 of the selected sender and operates the trunk connector 103 to connect the sender with the selected trunk. The marker then connects with and operates the line link switches 104 and trunk link switches 105 to connect the calling line with the trunk and releases.

The seizure of trunk 106 causes the register connector 107 to connect an incoming register including the equipment shown with trunk 106. When the register is ready to receive pulses, it causes the trunk supervisory circuit 108 at the called office to transmit a signal over trunk 106 which is repeated by the trunk supervisory circuit 109 at the calling office to the sender.

In response to this signal, the digit steering chain 110 functions to successively enable those two of the oscillators 111 which have been selected by the digit storage relays 102, the enabled oscillator transmitting alternating current over pulsing circuit 112 which has been extended to the receiving equipment of the register at the wanted office. It may be noted that the talking circuit is held disconnected from the trunk during the designation transfer by means of the trunk splitting circuits 113 and 114.

In the register, the alternating-current code signals are received by a limiting amplifier 115, tuned filters 116, rectifiers 117 and detectors 118 which selectively operate the registers 119 which are successively rendered responsive by the steering chain 120. Each designation is preceded by a start signal which operates start circuit 121 to initiate the operation of the steering chain 120, the steering chain 120 being advanced in response to the reception of each digit under the control of the chain advance circuit 122. Following the last digit an end signal is sent which operates the end circuit 123.

The end circuit 123 in turn operates marker connector 124 which connects an idle marker 125 with the register, whereupon the registered designation is transferred to the marker 125 which in turn connects with and operates trunk link switches 126 and line link switches 127 to connect trunk 106 with the wanted subscriber's line 128. The trunk splitting circuits 113 and 114 now operate to disconnect the sender and register and complete the talking connection between substations 100 and 128. Ringing and supervision take place in the well-known manner.

A suitable register for generating and transmitting the multifrequency pulses is shown in applicant's copending application, Serial No. 190,492, filed October 17, 1950, which issued as Patent No. 2,580,095 on December 25, 1951.

When the register of the present invention has been selected, it is connected with the incoming trunk by means of a register connector 200, which also operates off-normal relay 201. Relay 201 locks under the control of release relay 202 and connects +130-volt battery to conductor 203 to prepare the tubes for operation. The trunk conductors are extended by the register connector 200 to a two-stage limiter amplifier 204 of the push-pull type, the output of which is fed through transformer 205 to a set of filters 206 to 212. Filters 206 to 211 are band-pass filters designed to pass frequencies of 700 cycles, 900 cycles, 1100 cycles, 1300 cycles, 1500 cycles and 1700 cycles, respectively. Filter 212 is a balancing filter used to improve the transmission characteristics of the circuit.

The output of each amplifier is connected to a full wave rectifier, comprising two rectifier elements, the output of amplifier 206, for example, being connected to a rectifier made up of elements 213 and 214.

Rectifier 214 is so poled that the negative half waves pass to the grid of detector 215. Rectifier 213 is poled to pass the positive half waves and is connected, in parallel, with the corresponding rectifiers belonging to the other filters 207 to 211 to the grid of tube 221.

The grid of each detector is connected over conductor 222 to ground through resistance 223 so that as soon as +130 volts is connected to conductor 203, tubes 215 to 220 and 221 become conducting, the anode potential normally being approximately 40 volts. The positive half waves reaching the grid of tube 221 cause an increase in the current flow through tube 221 and resistance 223 and thereby increase the bias on tubes 215 to 220 in proportion to the strength of the incoming signals.

When negative half cycles reach the grid of a detector, for example detector 215, the flow of current through that detector is cut off so that the potential on the anode, which is connected through resistance 224 to conductor 203 tends to rise to +130 volts. However, this potential is held to +105 volts by connecting the anode through a limiter rectifier 225 to a source of +105 volts provided by voltage regulator tube 226 and resistance 227 connected to the +130-volt supply conductor 203.

An individual diode, 228, 229, etc., is also connected between the anode of each detector and —48-volt battery through resistance 233 which has a value of 100,000 ohms. When a signal is received by detector 215 the voltage at the cathode end of diode 228 changes from —20 volts to +50 volts approximately and this voltage is applied through resistance 234 to the grid of the register chain advance triode 235, causing current to flow through tube 235.

Figure 4:
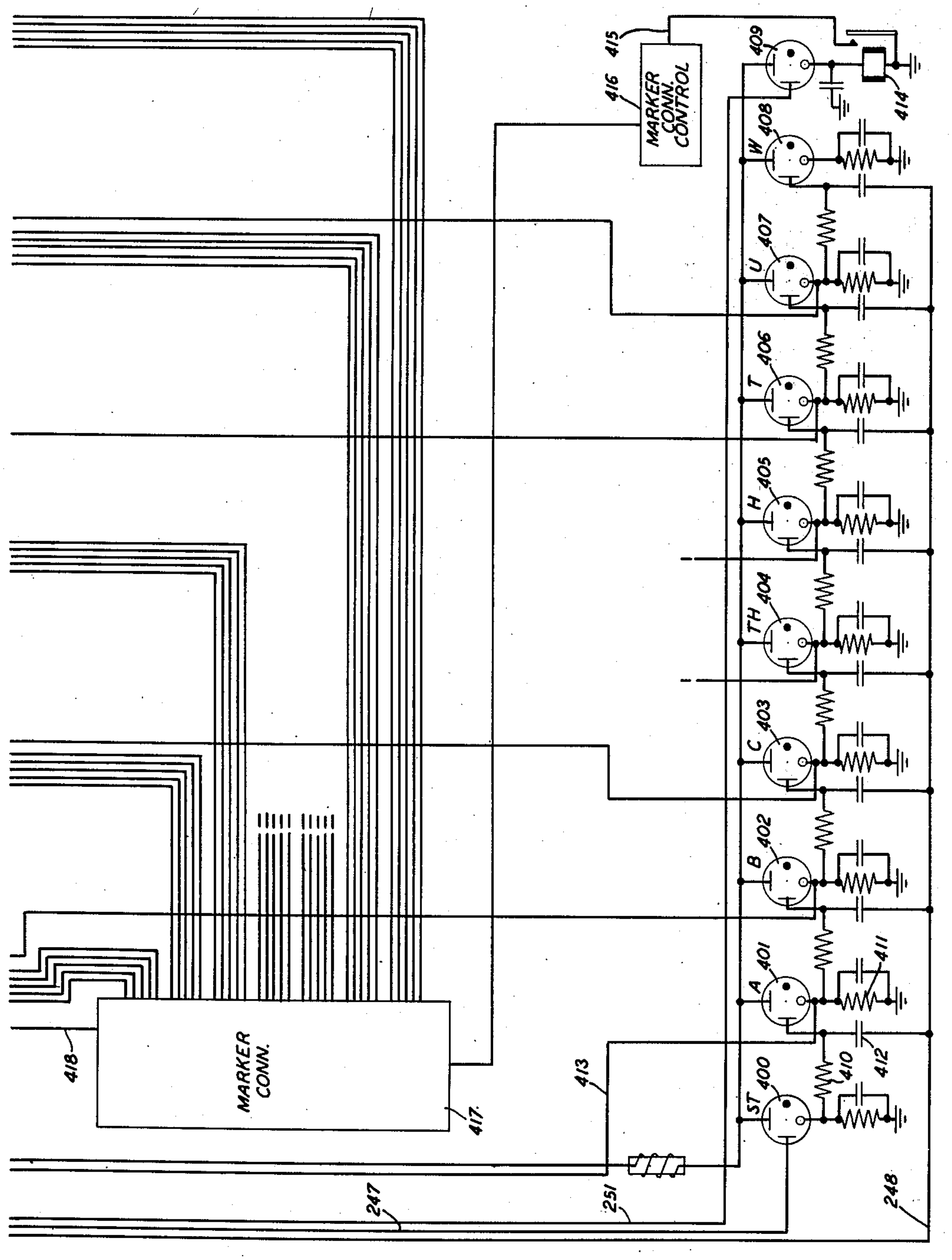
Fig. 4 shows a steering circuit.

The anode of tube 235 is connected through a 50,000-ohm resistance 236 to conductor 203 and through another 50,000-ohm resistance 237 to the control anode of tube 238 which is used to operate the steering chain of Fig. 4.

Figure 3:
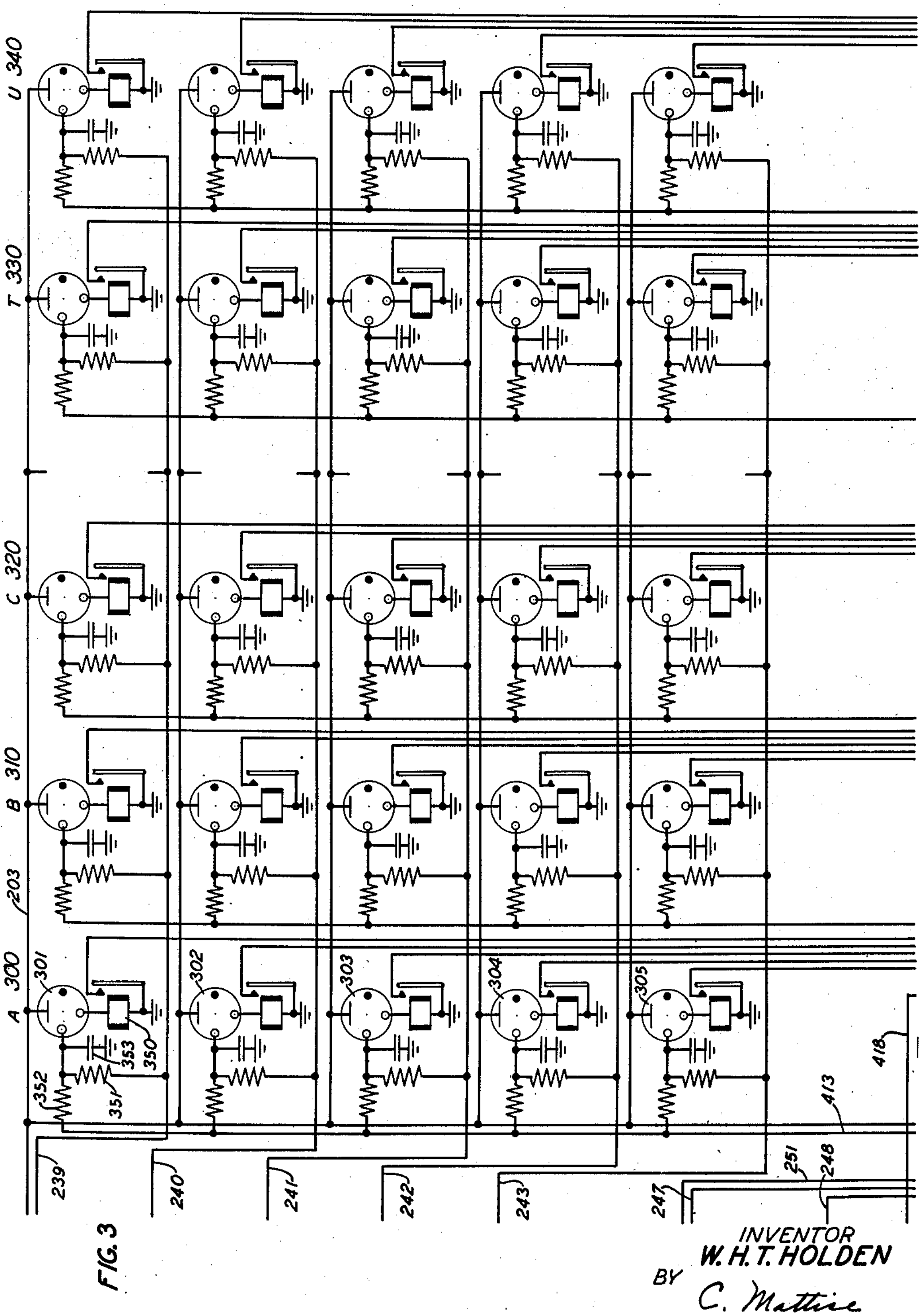
Fig. 3 shows a set of registers on which received designations are stored.

Each register of Fig. 3 comprises five gas-filled tubes, one for each of the detectors. Register 300, for example, includes tubes 301 to 305, corresponding respectively to detectors 215 to 220. Each tube is similarly arranged. For example, tube 301 has its main gap connected between ground through a register relay 350 and +130 volts on conductor 203. The control anode is connected through a 1-megohm resistance 351 to the output of the corresponding detector 215 over conductor 239 and through a second 1-megohm resistance 352 over conductor 413 to the cathode of the corresponding steering tube 401 which is normally connected to ground through resistance 411. A grounded condenser 353 is also connected to the control anode to absorb surge voltages.

The first pulse to reach the register is a start pulse made up of frequencies of 1700 cycles and 1100 cycles. Detectors 217 and 220 are cut off and the voltage on output conductors 241 and 244 rises as above described to +105 volts. Tube 235 becomes conducting but the register tube 303 is not affected since its control anode is grounded. Output conductors 241 and 244 are connected through rectifiers 245 and 246 in parallel to conductor 247 and the control anode of tube 400. Tube 400 becomes conducting and its cathode assumes a potential of +60 volts, which is applied through resistance 410 to the control anode of tube 401.

It may be noted that the rectifiers 245 and 246 are so arranged that although the potential on conductor 241 may rise in response to digit registration, the lower potential on conductor 244 prevents tube 400 from reoperating falsely.

When the start pulse ends, tube 235 will be cut off and tube 238 operates, causing the potential on conductor 248 to rise, charging condenser 412 to a potential which in combination with the potential supplied through resistance 410 causes tube 401 to break down and extinguishes tube 400. With tube 401 conducting, the cathode voltage rises to +60 volts which is applied over conductor 413 to the control cathodes of tubes 301 to 305 through individual 1-megohm resistances such as resistance 352 and to the control anode of tube 402.

Assuming that the first digit is three, the corresponding digit pulse will cause tubes 216 and 217 to be blocked and the potential on conductors 240 and 241 will rise to +105 volts so that the potential on the control anodes of tubes 302 and 303 will become the average of the two potentials applied thereto, that is, +82.5 volts causing these two tubes to break down and operate their associated register relays.

The following table will show the voltages on the control anode of a register tube by which it is possible for only those register tubes corresponding to signals present and operated steering tube to operate.

| Chain Tube Cathode Voltage | Signal Detector Anode Voltage | Register Control Cathode Voltage |
|---|---|---|
| 0 | 40 | 20 |
| 60 (chain tube on) | 40 | 50 |
| 0 | 105 (signal present) | 52.5 |
| 60 (chain tube on) | 105 (signal present) | 82.5 (operate) |

Tube 235 also conducts fully and lowers the voltage on the starter anode of tube 238 below the sustaining voltage so that tube 238 is extinguished.

At the end of the pulse, tube 235 is cut off and tube 238 ionized to cause the ionization of chain tube 402 and prepare the tubes of register 310. Tube 401 is deionized at this time. In a manner similar to that above described, each of the incoming digits is registered.

Following the last digit an end signal is received which is received by detectors 219 and 220, causing the potential on conductors 243 and 244 to rise to +105 volts. These conductors are connected through rectifiers 249 and 250 to conductor 251 to cause the ionization of tube 409 and the operation of relay 414.

Relay 414 grounds conductor 415 to initiate the operation of the marker control circuit 416 which operates the marker connector 417 to connect the register with the marker and transfer the registration to the marker. When the marker has completed its functions it connects ground through the marker connector to conductor 418, operating relay 202. Relay 202 opens the locking circuit of relay 201 which releases, removing +130-volt battery from conductor 203 to restore the pulse receiving and digit registration circuits to normal.

What is claimed is:

1. In a telephone system, an incoming circuit, alternating-current signals comprising a plurality of frequencies applied to said incoming circuit, a plurality of filters connected to said incoming circuit, each filter tuned to one of said signal frequencies, a plurality of detector tubes one connected to each of said filters, and means to render said detectors independent of the strength of said signals including a pair of oppositely poled rectifiers connected to each of said filters, one rectifier of each pair included in the connection between one filter and one detector, the other rectifiers of each pair connected in multiple to an auxiliary voltage limiter, and means to connect said auxiliary voltage limiter to each of said detectors in opposition to said one rectifier.

2. In a telephone system, an incoming circuit, alternating-current signals comprising a plurality of frequencies applied to said incoming circuit, each filter tuned to one of said signal frequencies, a plurality of detector tubes one connected to each of said filters, each of said tubes having a pair of output electrodes and a grid electrode, registering circuits connected to the output electrodes, means for providing a normal bias for said grids, means to render the output circuit of said detectors independent of the strength of said signals including a pair of oppositely poled rectifiers connected to each of said filters, one rectifier of each pair included in the connection between one filter and one detector and poled to pass the negative half cycles of said frequencies, the other rectifiers of each pair being poled to pass the positive half cycles of said frequencies and connected in multiple to an auxiliary voltage limiter, and means under the control of said auxiliary voltage limiter to vary said bias voltage.

WILLIAM H. T. HOLDEN.

REFERENCES CITED

The following references are of record in the file of this patent:

UNITED STATES PATENTS

| Number | Name | Date |
| --- | --- | --- |
| 2,250,100 | Hubbard | July 22, 1941 |